No. 803,475. PATENTED OCT. 31, 1905.
J. W. DENNIS.
DENTAL APPLICATOR.
APPLICATION FILED NOV. 15, 1904.
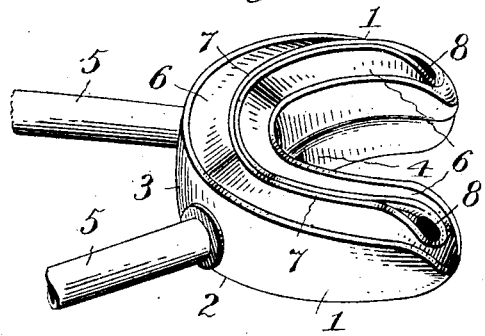
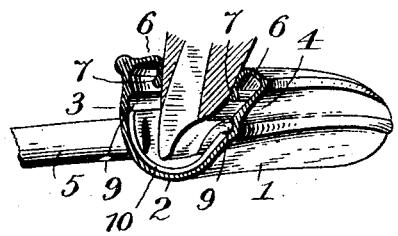
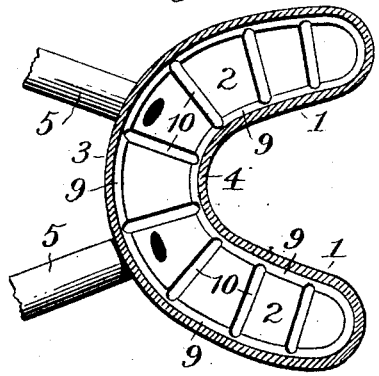
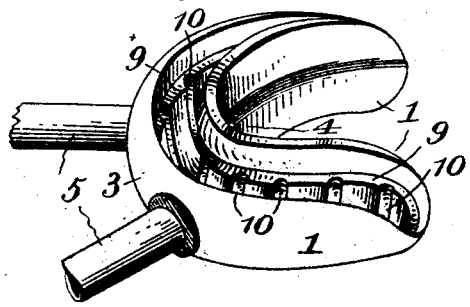
Witnesses:
Jas E. Hutchinson
F. R. Fitton
Inventor
James W. Dennis
By Wm N. Cromwell
Attorney

UNITED STATES PATENT OFFICE.

JAMES W. DENNIS, OF CINCINNATI, OHIO.

DENTAL APPLICATOR.

No. 803,475.　　　　Specification of Letters Patent.　　　　Patented Oct. 31, 1905.

Application filed November 15, 1904. Serial No. 232,866.

*To all whom it may concern:*

Be it known that I, JAMES W. DENNIS, a citizen of the United States, residing at Cincinnati, in the county of Hamilton and State of Ohio, have invented certain new and useful Improvements in Dental Applicators; and I do hereby declare the following to be a full, clear, and exact description of the invention, such as will enable others skilled in the art to which it appertains to make and use the same.

This invention relates to improvements in dental applicators, and is more especially designed as an improvement in the forms of such devices illustrated, described, and claimed in my pending application for patent filed June 14, 1904, Serial No. 212,530.

The object of the present invention is to so construct the applicator as to more easily hold the same in applied position and at the same time more perfectly separate the teeth and gums from the tongue, saliva, and air.

Furthermore, the invention aims to facilitate free and ample circulation of the fluid introduced into the applicator, thereby insuring contact of the fluid with all parts of the gums, whereby the scope of the applicator is greatly amplified and the device adapted for use in painless extraction of teeth; as a desensitizer for the gums before mounting crowns and bridges; in preparing the gums where weeping from the follides is excessive before mounting crowns and bridges, and as a flusher, purifier, and healing-medicator for mouths wearing artificial plates.

With these general objects in view and others which will appear as the nature of the improvements is better understood the invention consists, substantially, in the novel construction, combination, and arrangement of parts, as will be hereinafter fully described, illustrated in the accompanying drawings, and finally pointed out in the appended claims.

While the forms of the invention herein shown and described are what at the present time are preferable embodiments thereof, it will of course be understood that the invention is susceptible of further modification, and the right is accordingly reserved to change or vary the invention in accordance with the spirit and scope thereof.

In the drawings, Figure 1 is a perspective view of a dental applicator constructed in accordance with the present invention. Fig. 2 is a transverse sectional view thereof. Fig. 3 is a sectional plan view on the line 3 3, Fig. 2.

Fig. 4 is a perspective view of another form of applicator.

Referring in detail to the drawings, the numeral 1 designates the reservoir of the applicator, which reservoir in the main is similar to that disclosed in my former application hereinbefore mentioned, being formed of soft rubber and comprising a bottom 2, an anterior wall 3, and a posterior wall 4. Connected to the anterior wall 3 is a pair of tubes 5, whereby the reservoir is fed with a suitable treating agent from a suitable source.

As before stated, the present invention contemplates the provision of means for more easily holding the applicator in position and to more perfectly separate the teeth and gums from the tongue, saliva, and air, and to the accomplishment of this end a comparatively thin inwardly-folding closing flap 6, formed of soft rubber, is vulcanized or otherwise suitably fastened to the upper edge of each of the walls 3 and 4 and extends entirely around the same, said flaps having their free edges provided with a bead 7, which beads lie contiguous and conjointly form a slit disposed approximately midway said walls. The flaps 6 in their normal position extend over and cover the interior of the reservoir except at their extremities, at which point openings 8 are formed. Through the medium of said openings the flaps are separated and consequently capable of independent movement, so that when the applicator is applied, as shown in Fig. 2, the flaps are forced inwardly and press against the faces of the gums, the beads 7 engaging the gums, thereby effectually holding the reservoir in place, and also closely fitting against the gums to exclude saliva and air.

A further improvement contemplated by the present invention, as also previously stated, is to so construct the applicator as to facilitate free and ample circulation of the treating agent therein. For this purpose a continuous channel 9 is formed in the walls 3 and 4 and the ends of the bottom 2, which channel lies in a plane above the bottom 2, and at intervals throughout the length of the bottom a series of transverse channels 10 is provided, the ends of said transverse channels connecting with the side portions of the continuous channel, and thus affording a plurality of ducts or passages through which the fluid may freely circulate.

In Fig. 4 is illustrated another form of applicator. This, however, is precisely the same as in Figs. 1, 2, and 3, with the flaps 6 omitted, the form in Fig. 4 being also the same as in the hereinbefore-mentioned application filed by me but provided with the channels 9 and 10.

In use the applicator is applied to the gums by exerting sufficient pressure thereagainst to cause the flaps 6 to fold inwardly and position the same against the sides of the gums, and in such position the applicator is firmly held by the flaps. The treating agent is now introduced through the tubes 5 to the reservoir and either held therein or alternately introduced and withdrawn, as may be desired. When introduced to the reservoir, the agent will freely circulate through the channels 9 and 10, thus insuring contact of the agent with all parts of the gums and causing it to readily flow between and around the teeth incased by the applicator. When the reservoir is applied to the gums, as above indicated, the anterior and posterior walls so engage the gums as to enable a vacuum being formed within the reservoir, the effect of which is to draw impurities and accumulations from between and around the teeth and from under bridgework, as well as pus when such is formed and exuding from the gums. After the impurities have been thus displaced by the existing vacuum, which may be prolonged to any desired extent, antiseptics may be thrown in through the tubes 5 from a bulb (not shown) connected thereto to occupy the spaces which have been so emptied, and held therein and from contact with the saliva until the parts are thoroughly flushed.

Having thus described the invention, what is claimed as new, and desired to be secured by Letters Patent, is—

1. A device of the class described, comprising a reservoir adapted to be applied to the gums to incase and isolate the same, and to enable a vacuum being formed within the reservoir, the interior of said reservoir having a main channel formed therein, and a series of branch channels communicating with the main channel and extending transversely thereof to facilitate circulation of a treating agent in the reservoir, and means for introducing the treating agent to said reservoir.

2. A device of the class described, comprising a reservoir adapted to be applied to the gums to incase and isolate the same, said reservoir including a bottom, an anterior wall, and a posterior wall, the inner faces of said bottom and walls being channeled to facilitate circulation of a treating agent in the reservoir, and means for introducing the treating agent to said reservoir.

3. A device of the class described, comprising a reservoir adapted to be applied to the gums to incase and isolate the same, said reservoir including a bottom, an anterior wall, and a posterior wall, the inner faces of said walls having a main channel formed therein, the bottom also having a series of branch channels formed therein and communicating with the main channel to facilitate circulation of a treating agent therein, and means for introducing the treating agent to said reservoir.

4. A device of the class described, comprising a reservoir adapted to be applied to the gums to incase and isolate the same, means for introducing a treating agent to said reservoir, and a plurality of inwardly-folding closing flaps carried by said reservoir and adapted to engage the gums for holding the reservoir in applied position.

5. A device of the class described, comprising a reservoir adapted to be applied to the gums to incase and isolate the same, means for introducing a treating agent to said reservoir, the interior of said reservoir having a series of channels to facilitate circulation of the treating agent therein, and a plurality of closing flaps carried by said reservoir and adapted to engage the gums for holding the reservoir in applied position.

6. A device of the class described, comprising a reservoir adapted to be applied to the gums to incase and isolate the same, means for introducing a treating agent to said reservoir, the interior of said reservoir having a main channel formed therein and a series of branch channels communicating with the main channel to facilitate circulation of the treating agent therein, and a plurality of closing flaps carried by said reservoir and adapted to engage the gums for holding the reservoir in applied position.

In testimony whereof I affix my signature in the presence of two witnesses.

JAMES W. DENNIS.

Witnesses:
HAYWARD D. GATCH,
STANLEY M. WITHROW.